(12) United States Patent
Guo et al.

(10) Patent No.: US 10,663,289 B2
(45) Date of Patent: May 26, 2020

(54) METHOD AND APPARATUS FOR DETECTING CONCAVE CYLINDER AND CYLINDRICAL DIVERGING LENS

(71) Applicant: SOOCHOW UNIVERSITY, Suzhou (CN)

(72) Inventors: Peiji Guo, Suzhou (CN); Xi Chen, Suzhou (CN); Jianbin Fan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/326,242

(22) PCT Filed: May 9, 2017

(86) PCT No.: PCT/CN2017/083634
§ 371 (c)(1),
(2) Date: Feb. 18, 2019

(87) PCT Pub. No.: WO2018/000943
PCT Pub. Date: Jan. 4, 2018

(65) Prior Publication Data
US 2019/0219388 A1 Jul. 18, 2019

(30) Foreign Application Priority Data

Jul. 1, 2016 (CN) .......................... 2016 1 0504619

(51) Int. Cl.
| | |
|---|---|
| *G01B 11/24* | (2006.01) |
| *G01B 9/02* | (2006.01) |
| *G02B 17/00* | (2006.01) |
| *G01M 11/00* | (2006.01) |

(52) U.S. Cl.
CPC .......... *G01B 11/2441* (2013.01); *G01B 9/02* (2013.01); *G01B 9/02038* (2013.01); *G01M 11/005* (2013.01); *G02B 17/00* (2013.01)

(58) Field of Classification Search
CPC .......... G01B 11/2441; G01B 9/02038; G01M 11/005
See application file for complete search history.

(56) References Cited

U.S. PATENT DOCUMENTS

| | | | |
|---|---|---|---|
| 4,904,084 A * | 2/1990 | Geary | G01B 11/24 356/513 |
| 5,706,086 A * | 1/1998 | LaFleur | G01B 11/255 356/513 |
| 2007/0177156 A1* | 8/2007 | Mansfield | G01B 11/2441 356/512 |

FOREIGN PATENT DOCUMENTS

| | | |
|---|---|---|
| CN | 103175486 A | 6/2013 |
| CN | 103196387 A | 7/2013 |

(Continued)

OTHER PUBLICATIONS

Ayshah Alatawi, Absolute interferometric test of a cylindrical wavefront with a fiber optic, Nov. 14, 2014, Optical engineering, vol. 53(11), pp. 1-6 (Year: 2014).*

(Continued)

*Primary Examiner* — Michael P LaPage
(74) *Attorney, Agent, or Firm* — SZDC Law PC

(57) ABSTRACT

A method and an apparatus for detecting a concave cylinder and a cylindrical diverging lens are disclosed. In particular, a method for non-contact interference detection of a cylindrical shape is disclosed. A cylindrical converging lens and a cylindrical diverging lens are combined with a to-be-tested concave cylinder respectively. Wavefront error data of the combination of the cylindrical diverging lens and the to-be-tested concave cylinder and wavefront error data of the combination of the cylindrical converging lens and the to-be-tested concave cylinder are obtained through interference measurement respectively. Wavefront error data of a combination of the cylindrical diverging lens and the cylin- (Continued)

drical converging lens is then obtained through interference measurement. Shape error data of the to-be-tested concave cylinder, the cylindrical diverging lens, and the cylindrical converging lens is obtained respectively by using a difference algorithm and a wavefront recovery algorithm.

10 Claims, 2 Drawing Sheets

(56) References Cited

FOREIGN PATENT DOCUMENTS

| | | | |
|---|---|---|---|
| CN | 103292738 | A | 9/2013 |
| CN | 203657756 | U | 6/2014 |
| CN | 103994731 | A | 8/2014 |
| CN | 104697465 | A | 6/2015 |
| CN | 104976964 | A | 10/2015 |
| CN | 105318843 | A | 2/2016 |
| CN | 105890543 | A | 8/2016 |
| CN | 106197311 | A | 12/2016 |
| JP | H0666537 | A | 3/1994 |

OTHER PUBLICATIONS

Ma et al., Design and Production Error Analysis of CGH for Testing the Cylinder Surface, Optical Instructions, vol. 37, No. 5, Oct. 2015, pp. 419-425.
Yang, Master Thesis, "Study of Spherical Surface and Cylindrical Surface Absolute Measurement", Univ Nanjing Science & Tech, Aug. 30, 2004.

* cited by examiner

METHOD AND APPARATUS FOR DETECTING CONCAVE CYLINDER AND CYLINDRICAL DIVERGING LENS

This application is National Stage Application of PCT/CN2017/083634, filed on May 9, 2017, which claims priority to Chinese Patent Application No.: 201610504619.5, filed on Jul. 1, 2016, each of which is incorporated by reference for all purposes as if fully set forth herein.

FIELD OF THE INVENTION

The present invention relates to the technical field of optical instrument detection, and in particular, to a method and an apparatus for non-contact interference detection of a cylindrical shape.

BACKGROUND OF THE INVENTION

A meridional section and a sagittal section of a cylindrical optical element have different focal powers. Therefore, cylindrical optical elements are widely applied to optical systems that produce distorted images. In the civilian field, cylindrical optical elements are usually applied to anamorphic lenses, linear detector lighting, holographic lighting, barcode scanning, optical information processing, among other aspects. In recent years, with rapid development of intense laser systems, synchrotron radiation beamlines, linear test instruments, and the like, people require increasingly high cylindrical precision. However, applications of cylinder are always restricted by optical fabrication and detection technologies. Currently, the optical fabrication technology develops rapidly, but the detection technology to cylinder develops relatively slowly and generally cannot satisfy current application requirements. Therefore, a high-precision detection technology to cylinder becomes a key factor that restricts applications of cylinder. It becomes increasingly urgent to research and develop a high-precision detection technology to cylinder. High-precision detection constitutes the basis and guarantee for high-precision processing of optical elements, and is essential for high-precision processing. High-precision detection to cylinder is required to manufacture a satisfactory high-precision cylinder. However, high-precision detection to the shape of cylinders cannot be implemented by using common detection technologies because of special optical characteristics of the cylinders.

Currently, methods for detecting cylinders include template method, profilometer detection method, auxiliary plane method, optical fiber method, standard cylinder method, and computer-generated holography (CGH) method, wherein the template method and the profilometer detection method are contact detection, and a concave cylinder to be tested is easily scraped, and measurement precision is relatively low. The auxiliary plane method cannot detect an asymmetric deviation of a cylindrical shape. The auxiliary plane method and the optical fiber method are only applicable to cylinders with relatively small diameters. In the CGH method, a hologram needs to be separately designed, made, and computed according to the size and curvature radius of a detected cylinder. Usually, a minimum spacing between scribe lines of holographic gratings is very small, which is difficult to process and it is difficult to ensure precision. In the standard cylinder method, a standard cylinder with very high precision needs to be processed first, and the detection of the standard cylinder is still significantly difficult. Moreover, the shape precision of the standard cylinder directly affects the measurement precision of a cylinder to be detected, which increases the costs of processing and detection.

The standard cylinder method is shown in FIG. 1. A beam of parallel light passes through a standard cylindrical lens 14 configured to generate a cylindrical wave. A part of the light is transmitted. The transmitted light first converges at the center of the curvature of the cylinder to form a linear focal line 2 and then diverges to reach a cylinder 1 to be tested. When the center line of curvature of the cylinder to be tested coincides with a focal line of the standard cylindrical lens, a light wave reflected by the cylinder is used as a detected light wave with shape information of the cylinder. In the figure, a rear surface of the standard cylindrical lens 14 is a standard cylinder having a shape with very high precision. A center line of curvature of the standard cylinder coincides with the focal line of the standard cylindrical lens. A beam reflected by this surface is used as a reference light wave. Interference occurs between the detected light wave and the reference light wave to form an interferogram, and a shape deviation of the detected cylinder is determined according to the interferogram. The standard cylindrical lens is required in the detection method in which relatively high shape quality is required. Consequently, processing is difficult and the cost is high.

SUMMARY OF THE INVENTION

The objective of the present invention is to provide a method and an apparatus for detecting a concave cylinder and a cylindrical diverging lens. A cylindrical diverging lens and a cylindrical converging lens are used respectively to detect a cylindrical shape, and a difference method is used to eliminate errors regarding the cylindrical diverging lens and the cylindrical converging lens, so as to obtain shape error data of a to-be-tested concave cylinder and shape error data of the cylindrical diverging lens and the cylindrical converging lens. In this detection solution, the requirement to shape precision of the cylindrical diverging lens and the cylindrical converging lens is reduced, and mutual detection between the cylindrical diverging lens, the cylindrical converging lens and the to-be-tested concave cylinder can be implemented, so that processing difficulty of cylindrical lenses is reduced, and measurement errors of cylinders are reduced by using the difference method, thereby resolving the technical problem that high-precision detection tools need to be processed before a cylinder can be detected. High-precision measurement of a cylinder is implemented by using mutual detection and maintenance between the cylindrical diverging lens, the cylindrical converging lens and the to-be-tested concave cylinder.

Specific steps in the technical solution of the present invention are as follows:

Step 1): steps of collecting wavefront error data of a combination of a cylindrical diverging lens and a to-be-tested concave cylinder: sequentially arranging an interferometer configured to provide parallel light, the cylindrical diverging lens configured to modulate parallel light into a cylindrical wave, and the to-be-tested concave cylinder in a direction of an optical axis, where a center line of curvature of the to-be-tested concave cylinder coincides with a virtual focal line formed by parallel light passing through the cylindrical diverging lens; making adjustments to enable the optical elements on the optical axis to be optically coaxial; and performing measurement by using the interferometer to obtain interferogram data of a parallel-light reference wavefront and a detected wavefront $W_A$ that is returned to the interferometer, where the detected wavefront $W_A$ carries a wavefront error $W_3$ of the cylindrical diverging lens and a wavefront error $W_1$ of the to-be-tested concave cylinder;

Step 2): steps of collecting wavefront error data of a combination of a cylindrical converging lens and the to-be-tested concave cylinder: sequentially arranging the interferometer in step 1), the cylindrical converging lens configured to modulate parallel light into a cylindrical wave, and the to-be-tested concave cylinder in step 1) in the direction of the optical axis, where the center line of curvature of the to-be-tested concave cylinder coincides with a focal line formed by parallel light passing through the cylindrical converging lens; making adjustments to enable the optical elements on the optical axis to be optically coaxial; and performing measurement by using the interferometer to obtain interferogram data of the parallel-light reference wavefront and a detected wavefront $W_B$ that is returned to the interferometer, where the detected wavefront $W_B$ carries a wavefront error $W_4$ of the cylindrical converging lens and the wavefront error $W_1$ of the to-be-tested concave cylinder;

Step 3): steps of collecting wavefront error data of a combination of the cylindrical diverging lens and the cylindrical converging lens: sequentially arranging the interferometer in step 1), the cylindrical diverging lens in step 1), the cylindrical converging lens in step 2), and a standard planar reflector in the direction of the optical axis, where the focal line of the cylindrical converging lens coincides with the virtual focal line of the cylindrical diverging lens, the cylindrical converging lens is configured to remodulate diverging light into parallel light, and the standard planar reflector is placed behind the cylindrical converging lens and configured to return parallel light; making adjustments to enable the optical elements on the optical axis to be optically coaxial; and performing measurement by using the interferometer to obtain interferogram data of the parallel-light reference wavefront and a wavefront $W_C$ that is returned to the interferometer and carries information about the wavefront error $W_3$ of the cylindrical diverging lens and the wavefront error $W_4$ of the cylindrical converging lens; and Step 4): steps of performing data processing to acquire a shape error: recovering shape error data of the to-be-tested concave cylinder, the cylindrical diverging lens, and the cylindrical converging lens from the wavefronts $W_A$, $W_B$, and $W_C$ respectively obtained in the three measurements by using a wavefront recovery algorithm and data difference algorithms.

Preferred Technical Solutions:

To facilitate later data processing, the cylindrical diverging lens in step 3) and the cylindrical diverging lens in step 1) are located at the same position on the optical axis, a spatial rotation angle around the focal line of the cylindrical converging lens between the cylindrical converging lens in step 3) and the cylindrical converging lens in step 2) is 180 degrees, and the cylindrical converging lens is located at a position where the focal line of the cylindrical converging lens coincides with the virtual focal line of the cylindrical diverging lens.

The wavefront recovery algorithm is Fourier transform, multifold path integral or Zernike fitting, and the data difference algorithms are $W_1=(W_A+W_B-W_C)/2$, $W_3=(W_A+W_C-W_B)/2$, and $W_4=(W_B\ W_C-W_A)/2$.

In the foregoing technical solution, in the direction of the optical axis, the to-be-tested concave cylinder is placed on a rear end of the virtual focal line of the cylindrical diverging lens. Theoretically, a cylinder with any curvature radius can be detected. During actual detection, the factors such as light intensity and fringe contrast of reflected light will also need to be considered. Stitching measurement can be used for a to-be-tested concave cylinder with a large diameter. A plurality of cylinders with sub-diameters are planned on the to-be-tested concave cylinder, and measurement results of the cylinders with sub-diameters are stitched to measure the cylinder with a large diameter.

In step 2), to facilitate adjustment of a light path, an adjusting frame that combines three-dimensional translation and three-dimensional rotation can be selected. The cylindrical converging lens is fixed on a rotating platform. The rotating platform is fixed on the adjusting frame. The adjusting frame and the rotating platform are adjusted to enable the focal line formed by parallel light passing through the cylindrical converging lens to coincide with the center line of curvature of the to-be-tested concave cylinder.

In step 3), the rotating platform is rotated 180 degrees, and the focal line of the cylindrical converging lens is adjusted by using an adjusting frame to coincide with the virtual focal line of the cylindrical diverging lens.

The cylindrical diverging lens or the cylindrical converging lens may be selected from a standard cylindrical lens, a computer-generated holographic chip that enables parallel light to converge into a cylinder, and a single lens configured to modulate parallel light into a cylinder or a cylindrical converging system that includes more lenses. The cylindrical diverging lens can be any one selected from the foregoing types and combined with the cylindrical converging lens, and vice versa. Certainly, the cylindrical diverging lens is not limited to the foregoing types, and any other apparatus that can modulate parallel light into a cylindrical wave can be used.

Based on the foregoing method for detecting a cylinder and a cylindrical diverging lens, the present invention further provides an apparatus for detecting a concave cylinder and a cylindrical diverging lens.

The apparatus for detecting a concave cylinder and a cylindrical diverging lens includes a horizontal substrate, a first adjusting frame, a second adjusting frame, and a third adjusting frame that are disposed on the horizontal substrate, a horizontal rotating platform fixed on the second adjusting frame, a cylindrical diverging lens disposed on the first adjusting frame, a cylindrical converging lens disposed on the rotating platform, and a to-be-tested concave cylinder and a standard planar reflector that are clamped on the second adjusting frame, where:

The cylindrical diverging lens is optically coaxial with the cylindrical converging lens and the standard planar reflector to form a first combined test area; the cylindrical diverging lens is optically coaxial with the to-be-tested concave cylinder to form a second combined test area; and the cylindrical converging lens is optically coaxial with the to-be-tested concave cylinder to form a third combined test area;

The cylindrical converging lens in the first combined test area is placed at a rear end of the cylindrical diverging lens, and a focal line of the cylindrical converging lens coincides with a virtual focal line of the cylindrical diverging lens, the cylindrical converging lens is configured to remodulate diverging light into parallel light, and the standard planar reflector is placed at a rear end of the cylindrical converging lens and configured to return parallel light;

The to-be-tested concave cylinder in the second combined test area is placed at the rear end of the cylindrical diverging lens, and a center line of curvature of the to-be-tested concave cylinder coincides with the virtual focal line formed by parallel light passing through the cylindrical diverging lens; and The to-be-tested concave cylinder in the third combined test area is placed at the rear end of the cylindrical converging lens, and the center line of curvature of the to-be-tested concave cylinder coincides with the focal line formed by parallel light passing through the cylindrical converging lens; and A spatial rotation angle around the focal line of the cylindrical converging lens between the cylindrical converging lens in the first combined test area and the cylindrical converging lens in the third combined test area is 180 degrees, and a curvature radius R of the to-be-tested concave cylinder is greater than a focal length f of the cylindrical diverging system.

The apparatus may further include a digital wavefront interferometer configured to provide parallel light, where the interferometer is respectively optically coaxial with the optical elements in the first combined test area, the second combined test area, and the third combined test area.

The positions of a cylindrical diverging system and a cylindrical converging system are interchangeable. During actual use, the positions of the cylindrical diverging system and the cylindrical converging system are interchangeable.

Preferred technical solution: A front surface of the to-be-tested concave cylinder is a cylinder, a rear surface of the to-be-tested concave cylinder is a plane, and the cylinder is optically coaxial with the plane. The plane on the rear surface of such a cylinder with a flat cylinder structure can replace the standard planar reflector in the first combined test area to directly return parallel light.

Compared with the prior art, the present invention has the following obvious advantages: (1) A high-precision detection tool such as a standard cylindrical lens or a computer-generated hologram configured to generate a cylindrical wave does not need to be processed in advance, so that processing and detection difficulty of the detection tool is reduced. (2) One cylindrical diverging lens, one cylindrical converging lens, and a cylindrical lens are combined and mutually detected, so that system errors in measurement are reduced. The apparatus can implement high-precision detection of a concave cylindrical lens or a cylindrical diverging lens.

Where:
1 denotes a to-be-tested concave cylinder;
2 denotes a focal line (virtual focal line);
3 denotes a cylindrical diverging lens configured to modulate parallel light into a diverging cylindrical wave;
4 denotes a cylindrical converging lens configured to modulate parallel light into a converging cylindrical wave;
5 denotes a standard planar reflector;
6 to 8 respectively denote a first adjusting frame, a second adjusting frame, and a third adjusting frame;
9 denotes a first combined test area;
10 denotes a rotating platform;
11 denotes a horizontal substrate;
12 denotes a second combined test area;
13 denotes a third combined test area; and
14 denotes a standard cylindrical lens.

DETAILED DESCRIPTION OF THE EMBODIMENTS

The "method and apparatus for detecting a cylinder and a cylindrical diverging lens" of the present invention are further described below with reference to the accompanying drawings and embodiments.

Figure 3:
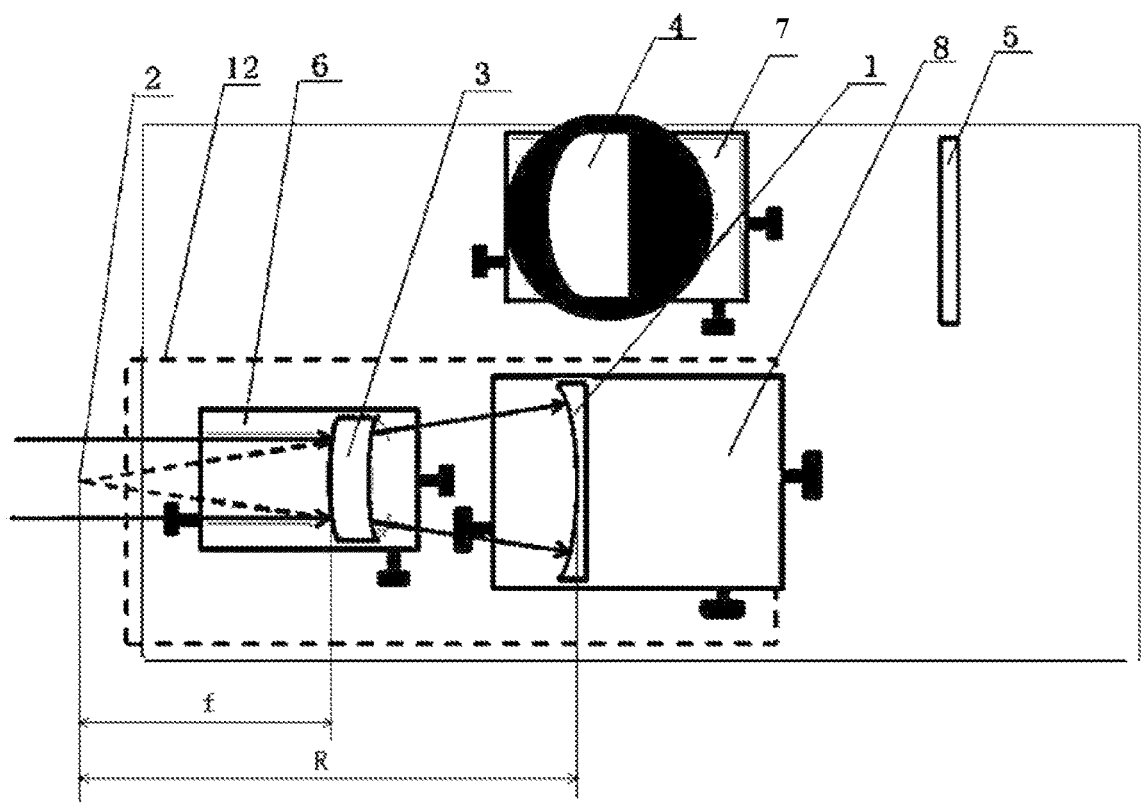
FIG. 3 is a schematic structural diagram of a combination of a cylindrical diverging lens and a to-be-tested concave cylinder in a second combined test area.

Embodiment 1 provides a method for detecting a concave cylinder and a cylindrical diverging lens, including the following steps:

Step 1) is a step of collecting wavefront error data of a combination of a cylindrical diverging lens 3 and a to-be-tested concave cylinder 1. As shown in FIG. 3, a commercial digital wavefront interferometer, the cylindrical diverging lens 3, and the to-be-tested concave cylinder 1 are sequentially arranged in a direction of an optical axis. A 4-inch plane standard lens is selected as a standard lens of the interferometer and is configured to provide parallel light. A focal length of the cylindrical diverging lens 3 is −100 mm. The cylindrical diverging lens 3 enables wavefronts of parallel light to converge into a cylindrical wave and intersect at a focal line 2. The to-be-tested concave cylinder 1 is a concave cylinder having a curvature radius of 300 mm. The position of the to-be-tested concave cylinder is adjusted to enable a center line of curvature of the to-be-tested concave cylinder to coincide with the focal line 2. Make adjustments to enable the optical elements on the optical axis to be optically coaxial. Measurement is performed by using the interferometer to obtain interferogram data of a parallel-light reference wavefront and a detected wavefront $W_A$ that is returned to the interferometer. The detected wavefront $W_A$ carries a wavefront error $W_3$ of the cylindrical diverging lens 3 and a wavefront error $W_1$ of the to-be-tested concave cylinder 1.

Figure 4:
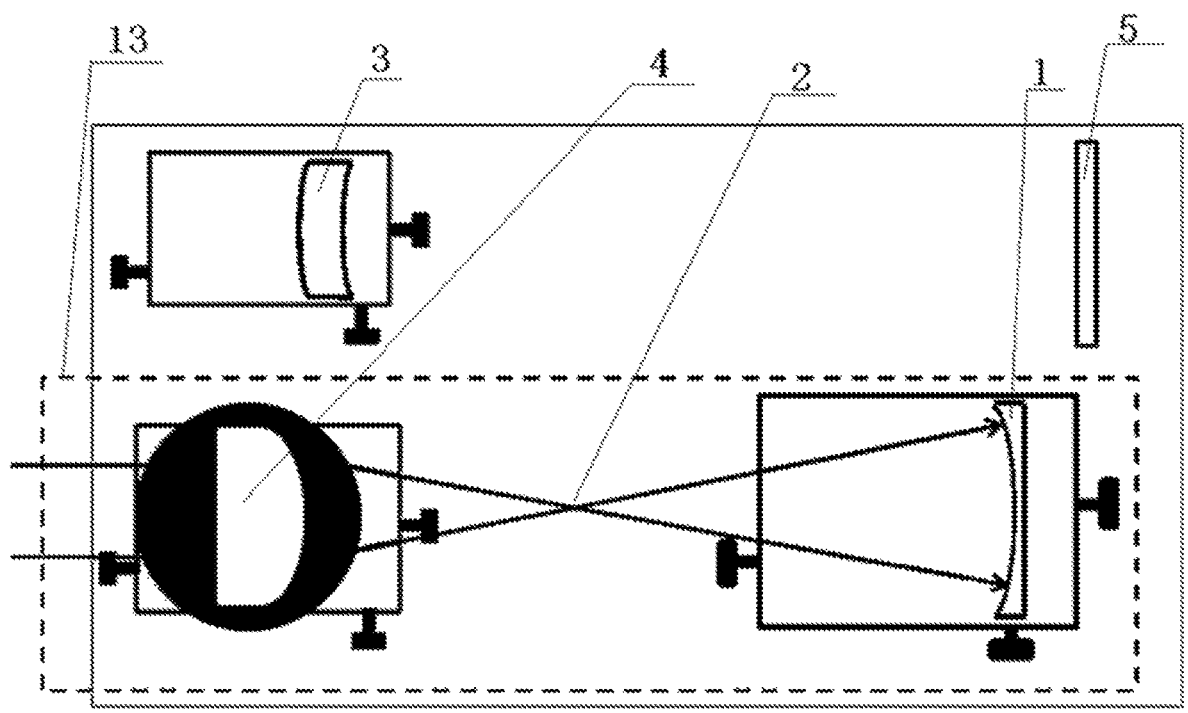
FIG. 4 a schematic structural diagram of a combination of a cylindrical converging lens and a to-be-tested concave cylinder in a third combined test area.

Step 2) is a step of collecting wavefront error data of a combination of a cylindrical converging lens 4 and the to-be-tested concave cylinder 1. As shown in FIG. 4, the cylindrical diverging lens 3 is replaced with another cylindrical converging lens 4 having a focal length of 100 mm, and step 1) is repeated. Measurement is performed by using the interferometer to obtain interferogram data of the parallel-light reference wavefront and a detected wavefront $W_B$ that is returned to the interferometer. The detected wavefront $W_B$ carries a wavefront error $W_4$ of the cylindrical converging lens 4 and the wavefront error $W_1$ of the to-be-tested concave cylinder 1.

Figure 1:
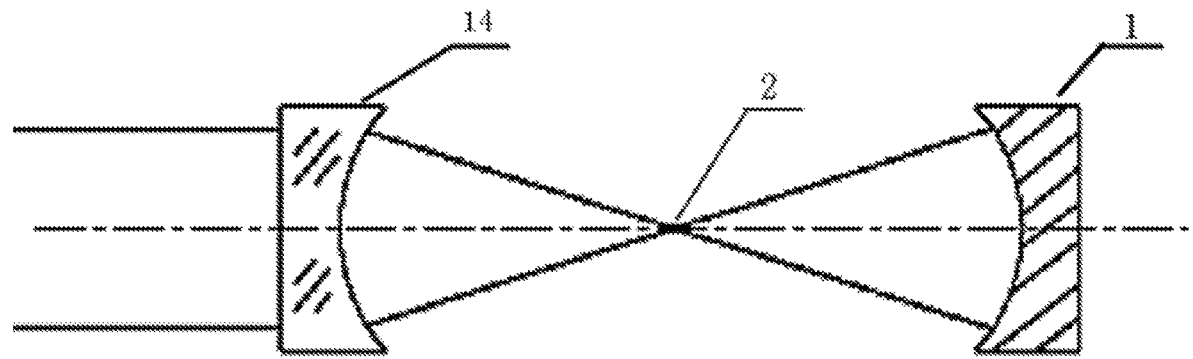
FIG. 1 is a schematic diagram of a light path of detecting a cylinder by using a standard cylinder method.
Figure 2:
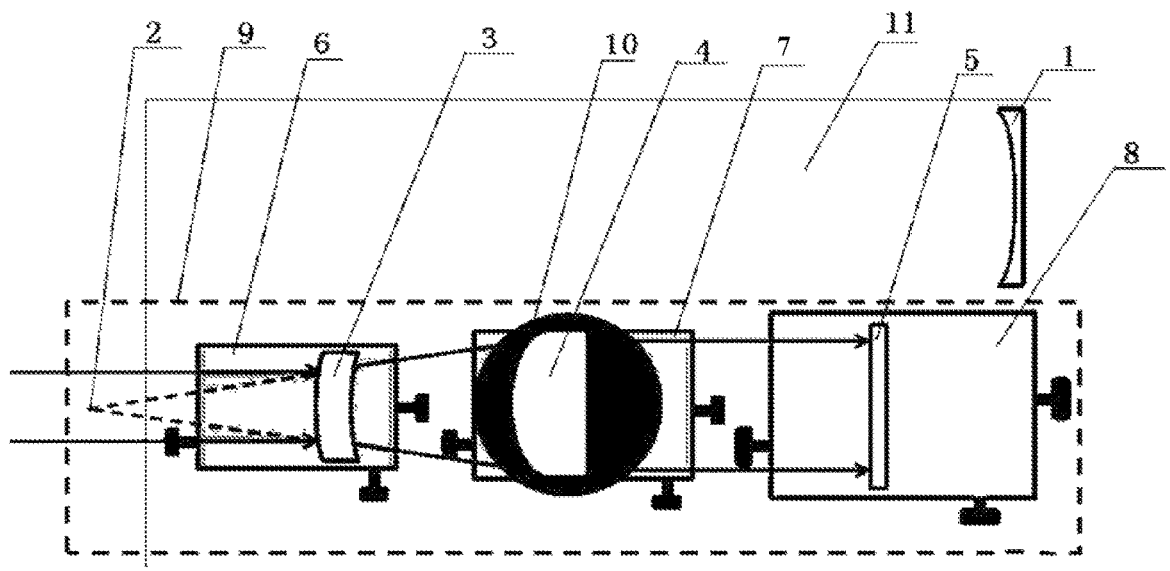
FIG. 2 is a schematic structural diagram of a combination of a cylindrical diverging lens and a cylindrical converging lens in a first combined test area.

Step 3) is a step of collecting wavefront error data of a combination of the cylindrical diverging lens 3 and the cylindrical converging lens 4. As shown in FIG. 2, the interferometer in step 1), the cylindrical diverging lens 3 in step 1), the cylindrical converging lens 4 in step 2), and a standard planar reflector 5 are sequentially arranged in the direction of the optical axis. The focal line 2 of the cylindrical converging lens 4 coincides with a virtual focal line of the cylindrical diverging lens 3. The cylindrical converging lens 4 is configured to remodulate diverging light passing through the focal line 2 into parallel light. The standard planar reflector 5 is placed behind the cylindrical converging lens 4 and configured to return parallel light. Make adjustments to enable the optical elements on the optical axis to be optically coaxial. Measurement is performed by using the interferometer to obtain interferogram data of the parallel-light reference wavefront and a wavefront $W_C$ that is returned to the interferometer and carries information about the wavefront error $W_3$ of the cylindrical diverging lens 3 and the wavefront error $W_4$ of the cylindrical converging lens 4.

Step 4) is a step of performing data processing to acquire a shape error: shape error data of the to-be-tested concave cylinder 1, the cylindrical diverging lens 3, and the cylindrical converging lens 4 are recovered from the wavefronts $W_A$, $W_B$, and $W_C$ respectively obtained in the three measurements by using a wavefront recovery algorithm and data difference algorithms.

Embodiment 2

To facilitate data processing, based on Embodiment 1, the cylindrical diverging lens 3 in step 3) and the cylindrical diverging lens 3 in step 1) in Embodiment 1 are located at the same position on the optical axis. A spatial rotation angle around the focal line of the cylindrical converging lens 4 between the cylindrical converging lens 4 in step 3) and the cylindrical converging lens 4 in step 2) is 180 degrees. The cylindrical converging lens 4 is located at a position where the focal line of the cylindrical converging lens 4 coincides with the virtual focal line of the cylindrical diverging lens 3. In step 4), the wavefront recovery algorithm is Fourier transform, multifold path integral or Zernike fitting, and the data difference algorithms are $W_1=(W_A+W_B-W_C)/2$, $W_3=(W_A+W_C-W_B)/2$, $W_4=(W_B+W_B-W_A)/2$.

Embodiment 3 provides a method for detecting a cylinder and a cylindrical diverging lens based on Embodiment 1. The to-be-tested concave cylinder may alternatively be a cylindrical converging lens. One cylindrical diverging lens and two cylindrical converging lenses are used to implement mutual detection. When the to-be-tested concave cylinder is a cylinder with a large diameter, several cylinders with sub-diameters are planned on the cylinder with a large diameter, each cylinder with a sub-diameter is separately measured, and eventually a data stitching algorithm is used to detect the cylinder with a large diameter.

Embodiment 4 provides an apparatus for detecting a concave cylinder and a cylindrical diverging lens. As shown in FIG. 2, the apparatus includes a horizontal substrate 11, a first adjusting frame 6, a second adjusting frame 7, and a third adjusting frame 8 that are disposed on the horizontal substrate 11, a horizontal rotating platform 10 fixed on the second adjusting frame 7, a cylindrical diverging lens 3 disposed on the first adjusting frame 6, a cylindrical converging lens 4 disposed on the rotating platform 10, and a to-be-tested concave cylinder 1 and a standard planar reflector 5 that are clamped on the second adjusting frame 7.

The cylindrical diverging lens 3 is optically coaxial with the cylindrical converging lens 4 and the standard planar reflector 5 to form a first combined test area 9. The cylindrical diverging lens 3 is optically coaxial with the to-be-tested concave cylinder 1 to form a second combined test area 12. The cylindrical converging lens 4 is optically coaxial with the to-be-tested concave cylinder 1 to form a third combined test area 13.

The cylindrical converging lens 4 in the first combined test area 9 is placed at a rear end of the cylindrical diverging lens 3. A focal line 2 of the cylindrical converging lens 4 coincides with a virtual focal line of the cylindrical diverging lens 3. The cylindrical converging lens 4 is configured to remodulate diverging light passing through the focal line 2 into parallel light. The standard planar reflector 5 is placed at a rear end of the cylindrical converging lens 4 and configured to return parallel light.

The to-be-tested concave cylinder 1 in the second combined test area 12 is placed at the rear end of the cylindrical diverging lens 3. A center line of curvature of the to-be-tested concave cylinder 1 coincides with the virtual focal line 2 formed by parallel light passing through the cylindrical diverging lens 3.

The to-be-tested concave cylinder 1 in the third combined test area 13 is placed at the rear end of the cylindrical converging lens 4. The center line of curvature of the to-be-tested concave cylinder 1 coincides with the focal line 2 formed by parallel light passing through the cylindrical converging lens 4.

A spatial rotation angle around the focal line of the cylindrical converging lens 4 between the cylindrical converging lens 4 in the first combined test area 9 and the cylindrical converging lens 4 in the third combined test area 13 is 180 degrees.

In the present invention, one cylindrical diverging lens and one cylindrical converging lens are combined and mutually detected to implement high-precision measurement. The advantage is that the problem of a shape test of a detection tool used to detect a cylinder is avoided. A difference algorithm can effectively reduce a processing precision requirement of a cylindrical diverging lens. In addition, the cylindrical diverging lens or the cylindrical converging lens may be selected from a group composed of a standard cylindrical lens, a computer-generated holographic chip, and a single lens configured to modulate parallel light into a cylinder or a cylindrical converging system that includes more lenses, so that the flexibility is relatively high. A cylinder with a large diameter can further be detected by using the present invention in combination with a stitching algorithm.

The invention claimed is:

1. A method for detecting a concave cylinder and a cylindrical diverging lens, comprising:

step 1): steps of collecting wavefront error data of a combination of a cylindrical diverging lens (3) and a to-be-tested concave cylinder (1): sequentially arranging an interferometer configured to provide parallel light, the cylindrical diverging lens (3) configured to modulate parallel light into a diverging cylindrical wave, and the to-be-tested concave cylinder (1) in a direction of an optical axis, wherein a center line of curvature of the to-be-tested concave cylinder (1) coincides with a virtual focal line (2) formed by parallel light passing through the cylindrical diverging lens (3); making adjustments to enable the optical elements on the optical axis to be optically coaxial; and performing measurement by using the interferometer to obtain interferogram data of a parallel-light reference wavefront and a detected wavefront $W_A$ that is returned to the interferometer, wherein the detected wavefront $W_A$ carries a wavefront error $W_3$ of the cylindrical diverging lens (3) and a wavefront error $W_1$ of the to-be-tested concave cylinder (1);

step 2): steps of collecting wavefront error data of a combination of a cylindrical converging lens (4) and the to-be-tested concave cylinder (1): sequentially arranging the interferometer in step 1), the cylindrical converging lens (4) configured to modulate parallel light into a cylindrical wave, and the to-be-tested concave cylinder (1) in step 1) in the direction of the optical axis, wherein the center line of curvature of the to-be-tested concave cylinder (1) coincides with a focal line (2) formed by parallel light passing through the cylindrical converging lens (4); making adjustments to enable the optical elements on the optical axis to be optically coaxial; and performing measurement by using the interferometer to obtain interferogram data of the parallel-light reference wavefront and a detected wavefront $W_B$ that is returned to the interferometer, wherein the detected wavefront $W_B$ carries a wavefront error $W_4$ of the cylindrical converging lens (4) and the wavefront error $W_1$ of the to-be-tested concave cylinder (1);

step 3): steps of collecting wavefront error data of a combination of the cylindrical diverging lens (3) and the cylindrical converging lens (4): sequentially arranging the interferometer in step 1), the cylindrical diverging lens (3) in step 1), the cylindrical converging lens (4) in step 2), and a standard planar reflector (5) in the direction of the optical axis, wherein the focal line (2) of the cylindrical converging lens (4) coincides with the virtual focal line of the cylindrical diverging lens (3), the cylindrical converging lens (4) is configured to remodulate diverging light into parallel light, and the standard planar reflector (5) is placed behind the cylindrical converging lens (4) and configured to return parallel light; making adjustments to enable the optical elements on the optical axis to be optically coaxial; and performing measurement by using the interferometer to obtain interferogram data of the parallel-light reference wavefront and a wavefront $W_C$ that is returned to the interferometer and carries information about the wavefront error $W_3$ of the cylindrical diverging lens (3) and the wavefront error $W_4$ of the cylindrical converging lens (4); and step 4): steps of performing data processing to acquire a shape error: recovering shape error data of the to-be-tested concave cylinder (1), the cylindrical diverging lens (3), and the cylindrical converging lens (4) from the wavefronts $W_A$, $W_B$, and $W_C$ respectively obtained in the three measurements by using a wavefront recovery algorithm and data difference algorithms.

2. The method for detecting a concave cylinder and a cylindrical diverging lens according to claim 1, wherein the cylindrical diverging lens (3) in step 3) and the cylindrical diverging lens (3) in step 1) are located at the same position on the optical axis, a spatial rotation angle around the focal line of the cylindrical converging lens (4) between the cylindrical converging lens (4) in step 3) and the cylindrical converging lens (4) in step 2) is 180 degrees, and the cylindrical converging lens (4) is located at a position where the focal line of the cylindrical converging lens (4) coincides with the virtual focal line of the cylindrical diverging lens (3).

3. The method for detecting a concave cylinder and a cylindrical diverging lens according to claim 2, wherein in step 4), the wavefront recovery algorithm is Fourier transform, multifold path integral or Zernike fitting, and the data difference algorithms are $W_1=(W_A+W_B-W_C)/2$, $W_3=(W_A+W_C-W_B)/2$, and $W_4=(W_B+W_C-W_A)/2$.

4. The method for detecting a concave cylinder and a cylindrical diverging lens according to claim 1, wherein the to-be-tested concave cylinder (1) can be replaced with the cylindrical converging lens.

5. The method for detecting a concave cylinder and a cylindrical diverging lens according to claim 1, wherein the cylindrical converging lens (4) in step 2) is fixed on a rotating platform (10), the rotating platform is fixed on a second adjusting frame (7), and the second adjusting frame (7) and the rotating platform (10) are adjusted to enable the focal line (2) formed by parallel light passing through the cylindrical converging lens (4) to coincide with the center line of curvature of the to-be-tested concave cylinder (1).

6. The method for detecting a concave cylinder and a cylindrical diverging lens according to claim 5, wherein in step 3), the rotating platform fixed with the cylindrical converging lens (4) in step 2) is rotated 180 degrees, and the focal line of the cylindrical converging lens (4) is adjusted by using an adjusting frame to coincide with the virtual focal line of the cylindrical diverging lens (3).

7. The method for detecting a concave cylinder and a cylindrical diverging lens according to claim 5, wherein the cylindrical diverging lens (3) or the cylindrical converging lens (4) may be selected from a standard cylindrical lens, a computer-generated holographic chip, and a single lens configured to modulate parallel light into a cylinder or a cylindrical system that comprises more lenses.

8. An apparatus for detecting a concave cylinder and a cylindrical diverging lens, comprising a horizontal substrate (11), a first adjusting frame (6), a second adjusting frame (7), and a third adjusting frame (8) that are disposed on the horizontal substrate (11), a horizontal rotating platform (10) fixed on the second adjusting frame (7), a cylindrical diverging lens (3) disposed on the first adjusting frame (6), a cylindrical converging lens (4) disposed on the rotating platform (10), and a to-be-tested concave cylinder (1) and a standard planar reflector (5) that are clamped on the second adjusting frame (7), wherein the cylindrical diverging lens (3) is optically coaxial with the cylindrical converging lens (4) and the standard planar reflector (5) to form a first combined test area (9); the cylindrical diverging lens (3) is optically coaxial with the to-be-tested concave cylinder (1) to form a second combined test area (12); and the cylindrical converging lens (4) is optically coaxial with the to-be-tested concave cylinder (1) to form a third combined test area (13), wherein the cylindrical converging lens (4) in the first combined test area (9) is placed at a rear end of the cylindrical diverging lens (3), a focal line (2) of the cylindrical converging lens (4) coincides with a virtual focal line of the cylindrical diverging lens (3), the cylindrical converging lens (4) is configured to remodulate diverging light into parallel light, and the standard planar reflector (5) is placed at a rear end of the cylindrical converging lens (4) and configured to return parallel light;

the to-be-tested concave cylinder (1) in the second combined test area (12) is placed at the rear end of the cylindrical diverging lens (3), and a center line of curvature of the to-be-tested concave cylinder (1) and coincides with the virtual focal line (2) formed by parallel light passing through the cylindrical diverging lens (3);

the to-be-tested concave cylinder (1) in the third combined test area (13) is placed at the rear end of the cylindrical converging lens (4), and the center line of curvature of the to-be-tested concave cylinder (1) coincides with the focal line (2) formed by parallel light passing through the cylindrical converging lens (4); and a spatial rotation angle around the focal line of the cylindrical converging lens (4) between the cylindrical converging lens (4) in the first combined test area (9) and the cylindrical converging lens (4) in the third combined test area (13) is 180 degrees, and a curvature radius R of the to-be-tested concave cylinder (1) is greater than a focal length f of the cylindrical diverging lens (3).

9. The apparatus for detecting a concave cylinder and a cylindrical diverging lens according to claim 8, further comprising a digital wavefront interferometer configured to provide parallel light, wherein the interferometer is respectively optically coaxial with the optical elements in the first combined test area (9), the second combined test area (12), and the third combined test area (13).

10. The apparatus for detecting a concave cylinder and a cylindrical diverging lens according to claim 8 or 9, wherein a rear surface of the to-be-tested concave cylinder (1) is a plane, and the concave cylinder is optically coaxial with the plane.

* * * * *